US009575780B2

United States Patent
Liu et al.

(10) Patent No.: US 9,575,780 B2
(45) Date of Patent: Feb. 21, 2017

(54) METHOD AND APPARATUS FOR GENERATING EXECUTABLE FILE OR MULTI-INSTANCE SERVICE

(71) Applicant: Huawei Technologies Co., Ltd., Shenzhen, Guangdong (CN)

(72) Inventors: Kai Liu, Shanghai (CN); Shilin Pan, Shanghai (CN); Miaofang Xia, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/341,337

(22) Filed: Jul. 25, 2014

(65) Prior Publication Data

US 2015/0040109 A1 Feb. 5, 2015

(30) Foreign Application Priority Data

Jul. 30, 2013 (CN) .......................... 2013 1 0325803

(51) Int. Cl.
| | | |
|---|---|---|
| *G06F 9/45* | (2006.01) | |
| *G06F 9/445* | (2006.01) | |
| *G06F 9/44* | (2006.01) | |
| *H04M 1/725* | (2006.01) | |

(52) U.S. Cl.
CPC .............. *G06F 9/44547* (2013.01); *G06F 8/71* (2013.01); *G06F 8/54* (2013.01); *G06F 9/4448* (2013.01); *H04M 1/72519* (2013.01)

(58) Field of Classification Search
USPC ......................................................... 717/140
See application file for complete search history.

(56) References Cited

U.S. PATENT DOCUMENTS

| | | | | |
|---|---|---|---|---|
| 6,298,479 | B1* | 10/2001 | Chessin et al. ............... 717/164 |
| 7,213,238 | B2* | 5/2007 | Klarer ................... G06F 8/4436 |
| | | | | 717/140 |
| 8,135,756 | B2* | 3/2012 | Brentano ............... G06Q 30/06 |
| | | | | 707/791 |
| 8,578,355 | B1* | 11/2013 | Mars ...................... G06F 8/443 |
| | | | | 717/153 |
| 2003/0023957 | A1* | 1/2003 | Bau et al. ..................... 717/140 |
| 2003/0041318 | A1* | 2/2003 | Klarer ................... G06F 8/4436 |
| | | | | 717/140 |
| 2008/0209400 | A1* | 8/2008 | Parker ...................... G06F 8/71 |
| | | | | 717/122 |
| 2011/0167417 | A1* | 7/2011 | Kobori ..................... G06F 8/54 |
| | | | | 717/149 |

(Continued)

*Primary Examiner* — Marina Lee

(57) ABSTRACT

The present invention relates to a method and an apparatus for generating an executable file of a multi-instance service. The method includes: performing compilation for a source file corresponding to a multi-instance service, to obtain a first-class object file, where the multi-instance service includes N instances, and N is a natural number greater than or equal to 2; performing an object copy of the first-class object file N−1 times, to obtain N−1 new first-class object files; and performing linking to the first-class object file and the N−1 new first-class object files, to generate an executable file. In the present invention, an executable file is generated by performing mirroring and linking processing for an object file obtained by compilation, thereby reducing a development cost and a maintenance cost of software source code.

12 Claims, 4 Drawing Sheets

(56) References Cited

U.S. PATENT DOCUMENTS

| | | | |
|---|---|---|---|
| 2011/0276945 A1* | 11/2011 | Chasman | G06F 11/3604 717/124 |
| 2011/0276950 A1* | 11/2011 | Fisher et al. | 717/140 |
| 2012/0317564 A1* | 12/2012 | Lee | G06F 8/61 717/175 |
| 2013/0042225 A1* | 2/2013 | Wu | G06F 9/44521 717/165 |
| 2014/0040864 A1* | 2/2014 | Li | 717/126 |
| 2015/0040109 A1* | 2/2015 | Liu et al. | 717/140 |
| 2015/0128119 A1* | 5/2015 | Skoglund et al. | 717/162 |
| 2015/0280983 A1* | 10/2015 | Staykoff | 717/140 |

\* cited by examiner

METHOD AND APPARATUS FOR GENERATING EXECUTABLE FILE OR MULTI-INSTANCE SERVICE

CROSS-REFERENCE TO RELATED APPLICATIONS

This application claims priority to Chinese Patent Application No. 201310325803.X, filed on Jul. 30, 2013, which is hereby incorporated by reference in its entirety.

TECHNICAL FIELD

The present invention relates to the field of communications technologies, and in particular, to a method and an apparatus for generating an executable file of a multi-instance service.

BACKGROUND

Dual-SIM dual-standby terminals and multi-SIM multi-standby terminals are now launched, driven by rapid development of communications technologies and people's increasingly higher requirements on communications devices. A dual-SIM dual-standby terminal can be equipped with two user identity cards, for example, a user identity module (User identity module, UIM) card, or a universal subscriber identity module (Universal Subscriber Identity Module, USIM) card, or a subscriber identity module (Subscriber Identity Module, SIM) card, and both of the user identity cards are in a standby state. In a multi-SIM multi-standby terminal, user identity cards are further added to a dual-SIM dual-standby terminal, and all these user identity cards can be in a standby state at the same time.

In the prior art, it is necessary to develop a new set of software source code that supports functions of user identity cards of a multi-SIM multi-standby terminal, so as to support operation of the user identity cards in the multi-SIM multi-standby terminal. The prior art has the following disadvantages: (1) due to long software development cycle, defects in code cannot be rapidly fixed after the code is developed, and product software that meets subscriber requirements cannot be rapidly made available; (2) a new set of multi-SIM multi-standby source code is developed in addition to existing software source code that supports functions of a user identity card of a one-card one-standby terminal, the two sets of product code cannot be merged, and therefore, the two sets of code need to be maintained separately, which increases difficulty and cost of code maintenance. This problem not only exists in code maintenance of a multi-SIM multi-standby terminal, but also exists in other multi-instance software applications.

SUMMARY

Embodiments of the present invention provide a method and an apparatus for generating an executable file of a multi-instance service, to reduce a development cost and a maintenance cost of software source code, and shorten a development cycle of the software source code.

In a first aspect, an embodiment of the present invention provides a method for generating an executable file of a multi-instance service, where the method includes:

performing compilation for a source file corresponding to a multi-instance service at a time, to obtain a first-class object file, where the multi-instance service includes N instances, and N is a natural number greater than or equal to 2;

performing an object copy of the first-class object file N−1 times, to obtain N−1 new first-class object files; and performing linking to the first-class object file and the N−1 new first-class object files, to generate an executable file.

In a first possible implementation, the performing an object copy of the first-class object file N−1 times is specifically: performing renaming processing for a global symbol in the first-class object file N−1 times, so as to obtain N−1 new first-class object files; or performing localization processing for a global symbol in the first-class object file N−1 times, so as to obtain N−1 new first-class object files.

With reference to the first aspect or the first possible implementation of the first aspect, in a second possible implementation, the method further includes: performing compilation for a source file corresponding to a single-instance service to obtain a second-class object file; and the performing linking to the first-class object file and the N−1 new first-class object files, to generate an executable file includes: performing linking to the first-class object file, the N−1 new first-class object files, and the second-class object file, to generate the executable file.

With reference to the first aspect or the first and second possible implementations of the first aspect, in a third possible implementation, before the performing compilation for a source file corresponding to a multi-instance service, to obtain a first-class object file, the method further includes: receiving service information input by a user; and analyzing the service information, to obtain the multi-instance service.

With reference to the third possible implementation of the first aspect, in a fourth possible implementation, the source file is a source file corresponding to communications software of a multi-SIM multi-standby terminal; the receiving service information input by a user includes: receiving supported service information of a primary user identity card and supported service information of a secondary user identity card of the multi-SIM multi-standby terminal; and the analyzing the service information, to obtain the multi-instance service includes: analyzing the supported service information of the primary user identity card and the supported service information of the secondary user identity card, to obtain the multi-instance service.

With reference to the third possible implementation of the first aspect, in a fifth possible implementation, the source file is a source file corresponding to user identity card management software of a multi-SIM terminal; the receiving service information input by a user includes: receiving service information of a primary user identity card and service information of the secondary user identity card of the multi-SIM terminal; and the analyzing the service information, to obtain the multi-instance service includes: analyzing the service information of the primary user identity card and the service information of the secondary user identity card, to obtain the multi-instance service.

With reference to the third possible implementation of the first aspect, in a sixth possible implementation, the source file is a source file corresponding to a camera driver of a multi-camera terminal; the receiving service information input by a user includes: receiving camera driver information of the multi-camera terminal; and the analyzing the service information, to obtain the multi-instance service includes: analyzing the driver information of the multi-camera terminal, to obtain the multi-instance service.

In a second aspect, an embodiment of the present invention provides an apparatus for generating an executable file of a multi-instance service, where the apparatus includes:

a compiling unit, configured to perform compilation for a source file corresponding to a multi-instance service at a time, to obtain a first-class object file, where the multi-instance service includes N instances, and N is a natural number greater than or equal to 2, and transmit the first-class object file to a mirroring unit;

a mirroring unit, configured to receive the first-class object file transmitted by the compiling unit, perform an object copy of the first-class object file N−1 times to obtain N−1 new first-class object files, and transmit the first-class object file and the N−1 new first-class object files to a linking unit; and the linking unit, configured to receive the first-class object file and the N−1 new first-class object files transmitted by the mirroring unit, and perform linking to the first-class object file and the N−1 new first-class object files, to generate an executable file.

In a first possible implementation, the mirroring unit is specifically configured to: perform renaming processing for a global symbol in the first-class object file N−1 times, so as to obtain N−1 new first-class object files; or perform localization processing for a global symbol in the first-class object file N−1 times, so as to obtain N−1 new first-class object files.

With reference to the second aspect or the first possible implementation of the second aspect, in a second possible implementation, the compiling unit is further configured to: perform compilation for a source file corresponding to a single-instance service to obtain a second-class object file, and transmit the second-class object file to the linking unit; and the linking unit is specifically configured to: receive the second-class object file transmitted by the compiling unit, and perform linking to the first-class object file, the N−1 new first-class object files, and the second-class object file, to generate the executable file.

With reference to the second aspect or the first and second possible implementations of the second aspect, in a third possible implementation, the apparatus further includes a receiving unit and an analyzing unit, where the receiving unit is configured to receive service information input by a user, and transmit the service information to the analyzing unit; and the analyzing unit is configured to receive the service information transmitted by the receiving unit, and analyze the service information, to obtain the multi-instance service.

With reference to the third possible implementation of the second aspect, in a fourth possible implementation, the source file is a source file corresponding to communications software of a multi-SIM multi-standby terminal; the receiving unit is specifically configured to: receive supported service information of a primary user identity card and supported service information of a secondary user identity card of the multi-SIM multi-standby terminal; and the analyzing unit is specifically configured to: analyze the supported service information of the primary user identity card and the supported service information of the secondary user identity card, to obtain the multi-instance service.

With reference to the third possible implementation of the second aspect, in a fifth possible implementation, the source file is a source file corresponding to user identity card management software of a multi-SIM terminal; the receiving unit is specifically configured to: receive service information of a primary user identity card and service information of the secondary user identity card of the multi-SIM terminal; and the analyzing unit is specifically configured to: analyze the service information of the primary user identity card and the service information of the secondary user identity card, to obtain the multi-instance service.

With reference to the third possible implementation of the second aspect, in a sixth possible implementation, the source file is a source file corresponding to a camera driver of a multi-camera terminal; the receiving unit is specifically configured to: receive camera driver information of the multi-camera terminal; and the analyzing unit is specifically configured to: analyze the driver information of the multi-camera terminal, to obtain the multi-instance service.

In the method and apparatus for generating an executable file of a multi-instance service provided in the embodiments of the present invention, compilation is performed for a source file corresponding to a multi-instance service to obtain an object file, mirroring processing is performed for the object file multiple times to obtain multiple new object files, and the generated object files are linked to obtain an executable file. In the embodiments of the present invention, the multi-instance service refers to a service applied to multiple scenarios. For example, for multi-SIM multi-standby terminal communications software (Modem Software), when multiple cards support a Global System for Mobile Communications (Global System of Mobile communication, GSM) network, GSM needs multiple instances, and a GSM service is a type of multi-instance service applied to multiple scenarios. In this way, in the embodiments of the present invention, compilation is performed for source code of a multi-instance service at a time, and an executable file is generated by performing mirroring and linking processing for an object file obtained by compilation, thereby reducing a development cost and a maintenance cost of software source code, and shortening a development cycle of the software source code.

DESCRIPTION OF EMBODIMENTS

The following clearly describes the technical solutions in the embodiments of the present invention with reference to accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Firstly, some terms involved in the embodiments are explained. An instance is a type of software program used to simulate a thing that is specific, exists in the real world, or has a certain type of prototype, and is a type of software simulation program. A source file refers to a code file written in an assembly language and a high-level language. An object file refers to binary code that is generated through a compilation process of a source file and can be directly identified by a CPU. Linking (linking) mainly refers to resolving an undefined symbol reference, replacing a placeholder in an object file with an address of a symbol, and implementing organization of address space of each object file in a program.

Figure 1:
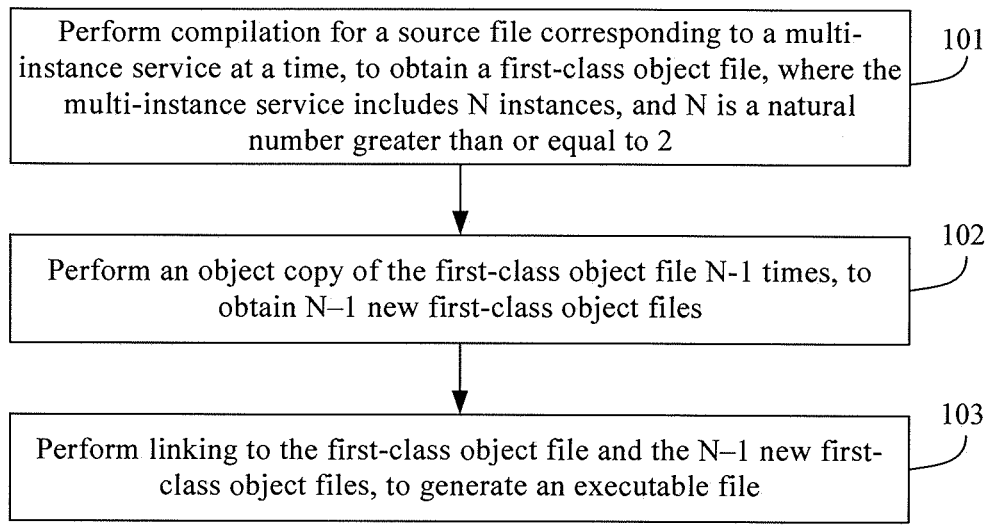
FIG. 1 is a flowchart of a method for generating an executable file of a multi-instance service according to an embodiment of the present invention.

FIG. 1 is a flowchart of a method for generating an executable file of a multi-instance service according to an embodiment of the present invention. This embodiment is executed by a terminal. This embodiment describes in detail a method for the terminal to perform compilation, mirroring, and linking to a source file according to a service scenario after receiving the service scenario input by a user, so as to generate an executable file. As shown in FIG. 1, this embodiment includes the following steps.

Step 101: Perform compilation for a source file corresponding to a multi-instance service at a time, to obtain a first-class object file, where the multi-instance service includes N instances, and N is a natural number greater than or equal to 2.

The terminal generally refers to a personal computer (Personal Computer, PC). When generating an executable file, the terminal firstly needs to determine a scenario in which the executable file to be generated will be applied. That is, before generating the executable file, the terminal firstly needs to receive a service scenario input by a user. For example, the executable file is applied in a scenario of a camera driver of a multi-camera terminal and all cameras have a same camera driver model; or the executable file is applied in a scenario of multi-standby support in a multi-SIM multi-standby terminal, where a primary card supports a GSM network and a Universal Mobile Telecommunications System (Universal Mobile Telecommunications System, UMTS) network, and two secondary cards support a GSM network. Apparently, a multi-SIM multi-standby terminal with one primary card and two secondary card is merely an example in this embodiment of the present invention, and the technical solution provided in this embodiment of the present invention is not limited thereto. For example, dual-SIM dual-standby may also be considered as a special type of multi-SIM multi-standby.

After receiving the service scenario, which is input by the user, of the executable file and before compiling the source file, the terminal may firstly classify the source file according to the service scenario into a multi-instance source file and a single-instance source file. For example, for the above-mentioned service scenario of multi-standby support in the multi-SIM multi-standby terminal, the terminal can determine, through analysis according to the service scenario, that three instances are required for GSM network support in the multi-standby support software, which means the GSM network support is a multi-instance service, and a source file corresponding to the GSM network support is a multi-instance source file; and that one instance is required for UMTS network support, which means the UMTS network support is a single-instance service, and a source file corresponding to the UMTS network support is a single-instance source file.

After the service scenario in which the executable file is applied is analyzed and the source code is classified, compilation can be performed for the source file corresponding to the multi-instance service, to obtain a first-class object file. In addition, if it is determined through analysis that there is further a single-instance service, compilation is also performed for a source file corresponding to the single-instance service, to obtain a second-class object file.

Step 102: Perform an object copy of the first-class object file N−1 times, to obtain N−1 new first-class object files.

After the first-class object file is obtained by compilation, an object copy may be performed for the generated first-class object file according to the analyzed number of scenarios corresponding to the multiple instances, to obtain multiple new first-class object files. A method of object copy may be performing renaming processing for a global symbol in the first-class object file or performing localization processing for a global symbol in the first-class object file.

Step 103: Perform linking to the first-class object file and the N−1 new first-class object files, to generate an executable file.

It should be noted that, if it is determined, through analysis according to the service scenario corresponding to the executable file, that there is further a single-instance service, linking processing is performed for the first-class object file and the N−1 new first-class object files when the linking processing is performed to generate an executable file.

In this embodiment of the present invention, compilation is performed for a source file corresponding to a multi-instance service at a time to obtain an object file, mirroring processing is performed for the object file multiple times to obtain multiple new object files, and the generated object files are linked to obtain an executable file. In this way, in this embodiment of the present invention, compilation is performed for source code of a multi-instance service at a time, and an executable file is generated by performing mirroring and linking processing for an object file obtained by compilation, thereby reducing a development cost and a maintenance cost, of software source code, and shortening a development cycle of the software source code.

In this embodiment of the present invention, the executable file may be communications software in a multi-SIM multi-standby terminal, or user identity card management software in a multi-SIM multi-standby terminal, or a camera driver of a multi-camera terminal. Each type of executable file may be generated by using either of the following two methods: a renaming method and a localization method. The two methods for generating an executable file will be separately introduced hereinafter.

Figure 2:
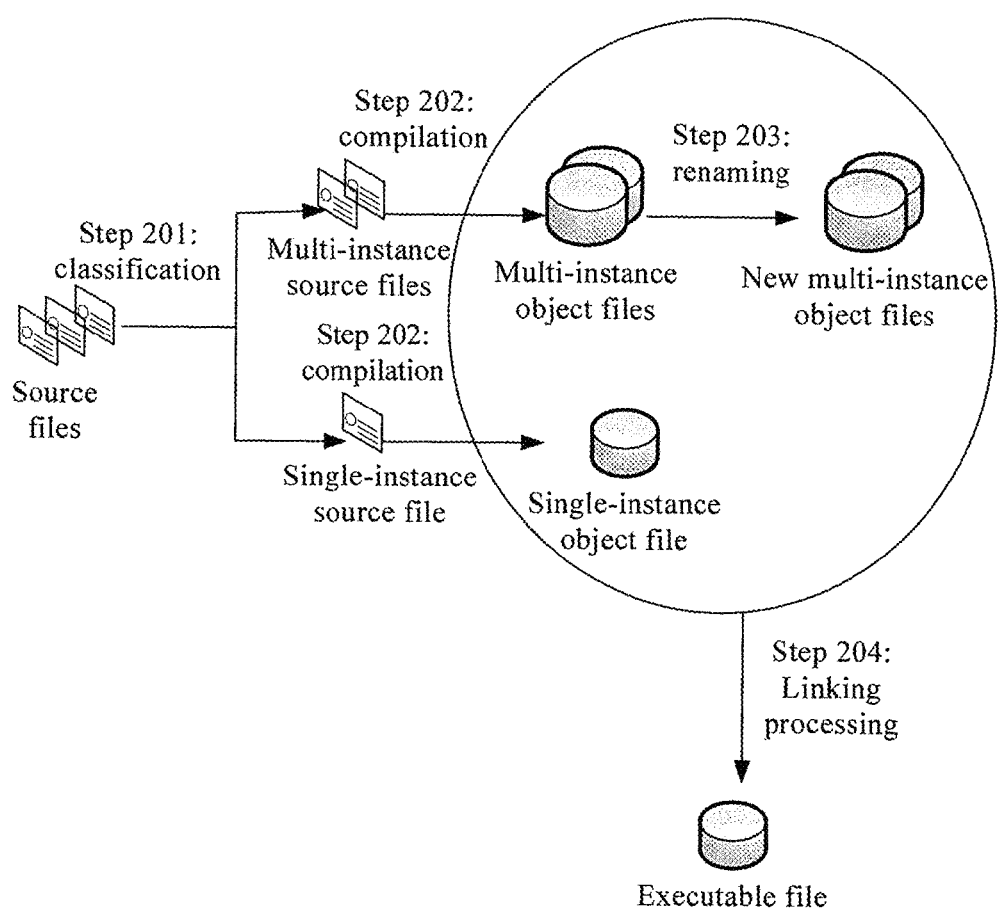
FIG. 2 is a schematic diagram of a method for generating an executable file of a multi-instance service according to an embodiment of the present invention.

FIG. 2 is a schematic diagram of a method for generating an executable file of a multi-instance service according to an embodiment of the present invention, where a method for generating communications software is described. The method specifically includes the following steps:

Step 201: Classify a source file.

In this embodiment, before the source file is classified, service information input by a user, that is, service scenario information, is received firstly. For a situation in which the executable file is communications software, the receiving a service scenario input by a user is specifically: receiving supported service information of a primary user identity card and supported service information of a secondary user identity card of a multi-SIM multi-standby terminal.

For a situation in which the executable file is user identity card management software of a multi-SIM terminal, the receiving a service scenario input by a user is specifically: receiving service information of a primary user identity card and service information of a secondary user identity card of the multi-SIM terminal.

For a situation in which the executable file is a camera driver of a multi-camera terminal, the receiving a service scenario input by a user is specifically: receiving camera driver information of the multi-camera terminal.

For example, the service scenario is a scenario in which a primary card supports a GSM network and a UMTS network, and two secondary cards support a GSM network.

The source file may be classified according to the service scenario. For example, for the above-mentioned service scenario of multi-standby support in the multi-SIM multi-standby terminal, the terminal can determine, through analysis according to the service scenario, that three instances are required for GSM network support in the multi-standby support software, which means the GSM network support is a multi-instance service, and a source file corresponding to the GSM network support is a multi-instance source file; and that one instance is required for UMTS network support, which means the UMTS network support is a single-instance service, and a source file corresponding to the UMTS network support is a single-instance source file.

Step 202: Perform compilation for the classified single-instance source file and multi-instance source file separately.

A single-instance object file is obtained after compilation is performed for the single-instance source file, and a multi-instance object file is obtained after compilation is performed for the multi-instance source file.

Step 203: Perform an object copy of the multi-instance object file by renaming a global symbol in the multi-instance object file.

Renaming is performed for the global symbol N−1 times, according to the number N of scenarios corresponding to the multi-instance service, to obtain N−1 new object files. For example, for the above-mentioned service scenario of multi-standby support in the multi-SIM multi-standby terminal, GSM network support in the multi-standby support software is applied to a primary card and two secondary cards, that is, applied in three scenarios, and an object copy can be performed twice by means of renaming, to obtain two new multi-instance object files.

It should be noted that, in a multi-SIM terminal, generally, services supported by a primary card include all services supported by the secondary cards, and therefore, compilation may be performed for source code of the services supported by the primary card firstly, and then the number of multi-instance services in the services supported by the primary card and the number of scenarios corresponding to each multi-instance service are analyzed, so as to perform subsequent renaming for the global symbol in the object file of the multi-instance service.

Step 204: Perform linking processing for each obtained object file.

Linking processing is performed for the single-instance object file, the multi-instance object file obtained by compilation, and the multi-instance object files obtained by object copy, to obtain an executable file.

In this way, in this embodiment of the present invention, an executable file is generated by using a method of renaming a global symbol in a multi-instance object file. Compared with the prior art, a development cost and a maintenance cost of software source code are reduced, a development cycle of the software source code is shortened, and defects in the multi-instance source file are rapidly fixed.

Figure 3:
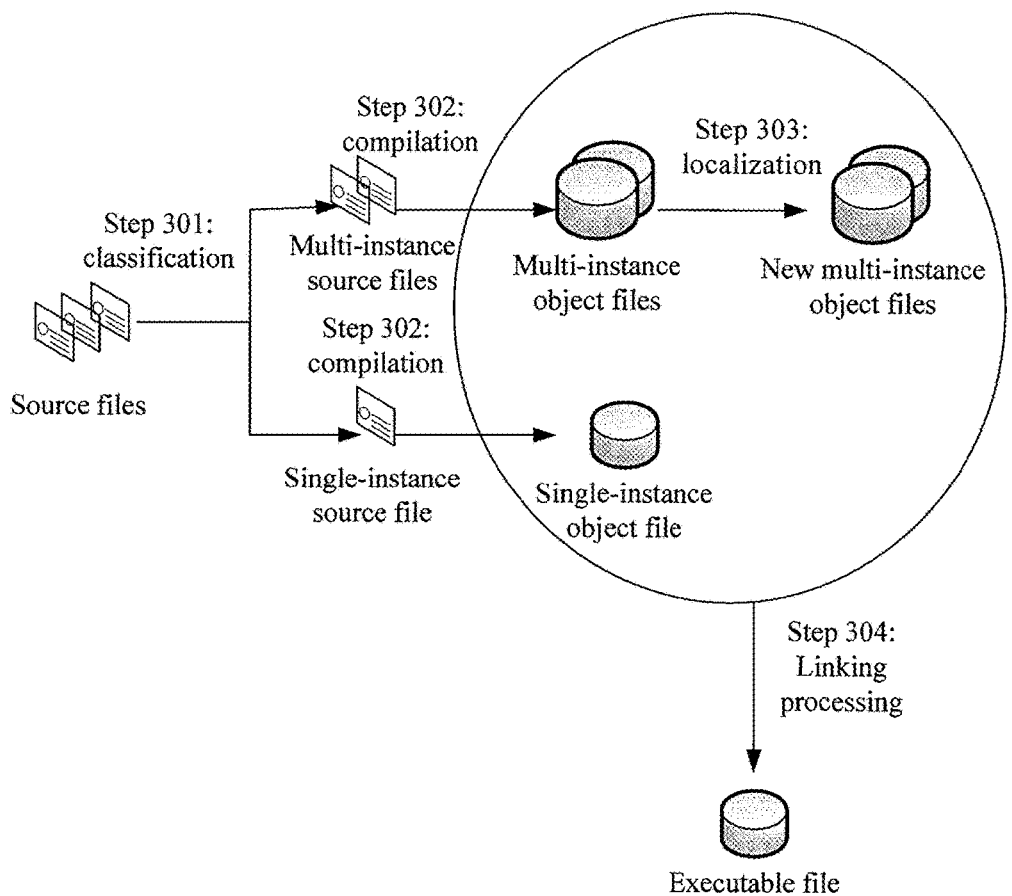
FIG. 3 is a schematic diagram of another method for generating an executable file of a multi-instance service according to an embodiment of the present invention.

In this embodiment of the present invention, an executable file of the multi-instance service can also be generated by using a method of localization. FIG. 3 is a schematic diagram of another method for generating an executable file of a multi-instance service according to an embodiment of the present invention. As shown in this figure, the generation method specifically includes the following steps:

Step 301: Classify a source file.

In this embodiment, before the source file is classified, service information to which the executable file is applied, that is, service scenario information, is received firstly. For a situation in which the executable file is communications software, the receiving a service scenario input by a user is specifically: receiving supported service information of a primary user identity card and supported service information of a secondary user identity card of a multi-SIM multi-standby terminal.

For a situation in which the executable file is user identity card management software of a multi-SIM terminal, the receiving a service scenario input by a user is specifically: receiving service information of a primary user identity card and service information of the secondary user identity card of the multi-SIM terminal.

For a situation in which the executable file is a camera driver of a multi-camera terminal, the receiving a service scenario input by a user is specifically: receiving camera driver information of the multi-camera terminal.

For example, the service scenario is a scenario in which a primary card supports a GSM network and a UMTS network, and two secondary cards support a GSM network.

The source file may be classified according to the service scenario. For example, for the above-mentioned service scenario of multi-standby support in the multi-SIM multi-standby terminal, the terminal can determine, through analysis according to the service scenario, that three instances are required for GSM network support in the multi-standby support software, which means the GSM network support is a multi-instance service, and a source file corresponding to the GSM network support is a multi-instance source file; and that one instance is required for UMTS network support, which means the UMTS network support is a single-instance service, and a source file corresponding to the UMTS network support is a single-instance source file.

Step 302: Perform compilation for the classified single-instance source file and multi-instance source file separately.

A single-instance object file is obtained after compilation is performed for the single-instance source file, and a multi-instance object file is obtained after compilation is performed for the multi-instance source file.

Step 303: Perform an object copy of the multi-instance object file by localizing a global symbol in the multi-instance object file.

Global symbol localization processing is performed N−1 times, according to the number N of scenarios corresponding to the multi-instance service, to obtain N−1 new object files. For example, for the above-mentioned service scenario of multi-standby support in the multi-SIM multi-standby terminal, GSM network support in the multi-standby support software is applied to a primary card and two secondary cards, that is, applied in three scenarios, and an object copy can be performed twice by means of localization, to obtain two new multi-instance object files.

It should be noted that, in a multi-SIM terminal, generally, services supported by a primary card include all services supported by the secondary cards, and therefore, compilation may be performed for source code of the services supported by the primary card firstly, and then the number of multi-instance services in the services supported by the primary card and the number of scenarios corresponding to each multi-instance service are analyzed, so as to perform subsequent localization for the global symbol in the object file of the multi-instance service.

Step 304: Perform linking processing for each obtained object file.

Linking processing is performed for the single-instance object file, the multi-instance object file obtained by compilation, and the multi-instance object files obtained by object copy, to obtain an executable file.

In this way, in this embodiment of the present invention, an executable file is generated by using a method of localizing a global symbol in a multi-instance object file. Compared with the prior art, a development cost and a maintenance cost of software source code are reduced, a development cycle of the software source code is shortened, and defects in the multi-instance source file are rapidly fixed.

Figure 4:
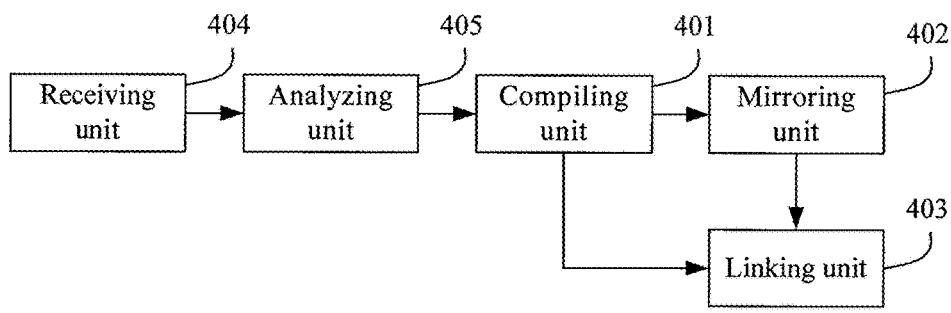
FIG. 4 is a schematic diagram of an apparatus for generating an executable file of a multi-instance service according to an embodiment of the present invention.
Figure 5:
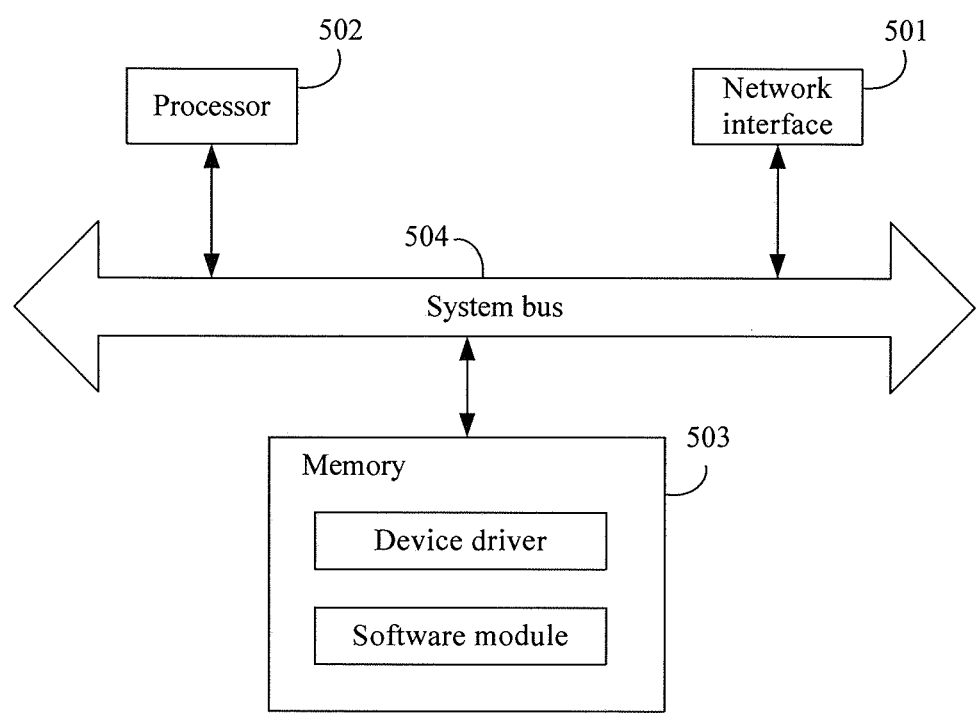
FIG. 5 is a schematic diagram of a terminal according to an embodiment of the present invention.

Correspondingly, an embodiment of the present invention further provides an apparatus for generating an executable file of a multi-instance service. FIG. 4 is a schematic diagram of an apparatus for generating an executable file of a multi-instance service according to an embodiment of the present invention. As shown in FIG. 4, the apparatus in this embodiment includes a compiling unit 401, a mirroring unit 402, and a linking unit 403.

The compiling unit 401 is configured to perform compilation for a source file corresponding to a multi-instance service, to obtain a first-class object file, where the multi-instance service includes N instances, and N is a natural number greater than or equal to 2, and transmit the first-class object file to the mirroring unit.

The mirroring unit 402 is configured to receive the first-class object file transmitted by the compiling unit, perform an object copy of the first-class object file N−1 times to obtain N−1 new first-class object files, and transmit the first-class object file and the N−1 new first-class object files to the linking unit.

The mirroring unit 402 is specifically configured to: perform renaming processing for a global symbol in the first-class object file N−1 times, so as to obtain N−1 new first-class object files; or perform localization processing for a global symbol in the first-class object file N−1 times, so as to obtain N−1 new first-class object files.

Specifically, after obtaining the first-class object file by compilation, the compiling unit 401 may perform an object copy of the generated first-class object file according to the analyzed number of scenarios corresponding to the multiple instances, to obtain multiple new first-class object files. A method of object copy may be performing renaming processing for a global symbol in the first-class object file or performing localization processing for a global symbol in the first-class object file.

The linking unit 403 is configured to receive the first-class object file and the N−1 new first-class object files transmitted by the mirroring unit, and perform linking to the first-class object file and the N−1 new first-class object files, to generate an executable file.

It should be noted that, if it is determined, through analysis according to a service scenario corresponding to the executable file, that there is further a single-instance service, the compiling unit 401 is further configured to: perform compilation for a source file corresponding to the single-instance service, to obtain a second-class object file, where the single-instance service is a service applied in a single scenario, and transmit the second-class object file to the linking unit; and the linking unit 403 is specifically configured to: receive the second-class object file transmitted by the compiling unit, and perform linking to the first-class object file, the N−1 new first-class object files, and the second-class object file, to generate the executable file.

Preferably, the apparatus provided in this embodiment of the present invention further includes: a receiving unit 404 and an analyzing unit 405. The receiving unit 404 is configured to receive service information input by a user, and transmit the service information to the analyzing unit. The analyzing unit 405 is configured to receive the service information transmitted by the receiving unit, and analyze the service information, to obtain the multi-instance service.

Preferably, if there is a single-instance service, the analyzing unit 405 may further obtain the single-instance service when analyzing the service information.

When the source file is a source file corresponding to communications software of a multi-SIM multi-standby terminal, the receiving unit 404 is specifically configured to: receive supported service information of a primary user identity card and supported service information of the secondary user identity cards of the multi-SIM multi-standby terminal; and the analyzing unit 405 is specifically configured to: analyze the supported service information of the primary user identity card and the supported service information of the secondary user identity cards, to obtain the multi-instance service and the number of corresponding scenarios, where if there is a single-instance service, the single-instance service is also obtained.

When the source file is a source file corresponding to user identity card management software of a multi-SIM terminal, the receiving unit 404 is specifically configured to: receive service information of a primary user identity card and service information of a secondary user identity card of the multi-SIM terminal; and the analyzing unit 405 is specifically configured to: analyze the service information of the primary user identity card and the service information of the secondary user identity module card, to obtain the multi-instance service and the number of corresponding scenarios, where if there is a single-instance service, the single-instance service is also obtained.

When the source file is a source file corresponding to a camera driver of a multi-camera terminal, the receiving unit 404 is specifically configured to: receive camera driver information of the multi-camera terminal; and the analyzing unit 405 is specifically configured to: analyze the driver information of the multi-camera terminal, to obtain the multi-instance service and the number of corresponding multi-camera drivers, where if there is a single-instance service, the single-instance service is also obtained.

In this embodiment of the present invention, compilation is performed for a source file corresponding to a multi-instance service to obtain an object file, mirroring processing is performed for the object file multiple times to obtain multiple new object files, and the generated object files are linked to obtain an executable file. In this way, in this embodiment of the present invention, compilation is performed for source code of a multi-instance service at a time, and an executable file is generated by performing mirroring and linking processing for an object file obtained by compilation, thereby reducing a development cost and a maintenance cost of software source code, and shortening a development cycle of the software source code.

Correspondingly, an embodiment of the present invention provides a terminal, and the terminal includes a network interface 501, a processor 502, and a memory 503. A system bus 504 is configured to connect the network interface 501, the processor 502, and the memory 503.

The network interface 501 is configured to connect to a terminal device to which an executable file is applied.

The memory 503 may be a permanent store, such as a hard disk drive and a flash memory. The memory 503 has a software module and a device driver. The software module includes various functional modules that can execute the foregoing methods of the present invention; and the driver may be a driver of a network and an interface.

On startup, these software modules are loaded to the memory 503, and then the processor 502 accesses the software modules and executes the following instructions:

performing compilation for a source file corresponding to a multi-instance service at a time, to obtain a first-class object file, where the multi-instance service includes N instances, and N is a natural number greater than or equal to 2;

performing an object copy of the first-class object file N−1 times, to obtain N−1 new first-class object files; and performing linking to the first-class object file and the N−1 new first-class object files, to generate an executable file.

Further, after the processor 502 accesses the software module in the memory 503, executing an instruction for performing an object copy of the first-class object file is specifically: performing renaming processing for a global symbol in the first-class object file N−1 times, so as to obtain N−1 new first-class object files; or performing localization processing for a global symbol in the first-class object file N−1 times, so as to obtain N−1 new first-class object files.

Further, after accessing the software module in the memory 503, the processor 502 further executes the following instruction: performing compilation for a source file corresponding to a single-instance service, to obtain a second-class object file.

Further, after the processor 502 accesses the software module in the memory 503, executing an instruction for performing linking to the first-class object file and the N−1 new first-class object files to generate an executable file is specifically: performing linking to the first-class object file, the N−1 new first-class object files, and the second-class object file, to generate the executable file.

Further, before performing compilation for a source file corresponding to a multi-instance service to obtain a first-class object file, the processor 502 further accesses the software module in the memory 503, and executes the following instructions:

receiving service information input by a user; and analyzing the service information, to obtain the multi-instance service.

When the source file is a source file corresponding to communications software of a multi-SIM multi-standby terminal, after the processor 502 accesses the software module in the memory 503, executing an instruction for receiving service information input by a user is specifically: receiving supported service information of a primary user identity card and supported service information of a secondary user identity card of the multi-SIM multi-standby terminal; and executing an instruction for analyzing the service information to obtain the multi-instance service is specifically: analyzing the supported service information of the primary user identity card and the supported service information of the secondary user identity card, to obtain the multi-instance service.

When the source file is a source file corresponding to user identity card management software of a multi-SIM terminal, after the processor 502 accesses the software module in the memory 503, executing an instruction for receiving service information input by a user is specifically: receiving service information of a primary user identity card and service information of the secondary user identity card of the multi-SIM terminal; and executing an instruction for analyzing the service information to obtain the multi-instance service is specifically: analyzing the service information of the primary user identity card and the service information of the secondary user identity card, to obtain the multi-instance service.

When the source file is a source file corresponding to a camera driver of a multi-camera terminal, after the processor 502 accesses the software module in the memory 503, executing an instruction for receiving service information input by a user is specifically: receiving camera driver information of the multi-camera terminal; and executing an instruction for analyzing the service information to obtain the multi-instance service is specifically: analyzing the driver information of the multi-camera terminal, to obtain the multi-instance service.

In this embodiment of the present invention, compilation is performed for a source file corresponding to a multi-instance service to obtain an object file, mirroring processing is performed for the object file multiple times to obtain multiple new object files, and the generated object files are linked to obtain an executable file. In this way, in this embodiment of the present invention, compilation is performed for source code of a multi-instance service at a time, and an executable file is generated by performing mirroring and linking processing for an object file obtained by compilation, thereby reducing a development cost and a maintenance cost of software source code, and shortening a development cycle of the software source code.

A person skilled in the art may be further aware that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, steps of the methods or algorithms may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing specific embodiments further describe the objectives, technical solutions, and beneficial effects of the present invention in detail. It should be understood that the foregoing descriptions are merely specific embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for generating an executable file of a multi-instance service, comprising:

corresponding a source file to communications software of a multi-Subscriber Identity Module (SIM) multi-standby terminal;

receiving supported service information of a primary user identity card of the multi-SIM multi-standby terminal and supported service information of a secondary user identity card of the multi-SIM multi-standby terminal;

analyzing the supported service information of the primary user identity card and the supported service information of the secondary user identity card, to obtain a multi-instance service;

performing compilation for the source file corresponding to the multi-instance service to obtain a first-class object file, wherein the multi-instance service comprises N instances, and N is a natural number greater than or equal to 2;

performing an object copy of the first-class object file N−1 times, to obtain N−1 new first-class object files; and performing linking to the first-class object file and the N−1 new first-class object files, to generate an executable file.

2. The method for generating an executable file of a multi-instance service according to claim 1, wherein performing the object copy of the first-class object file N−1 times comprises: performing renaming processing for a global symbol in the first-class object file N−1 times, so as to obtain the N−1 new first-class object files; or performing localization processing for the global symbol in the first-class object file N−1 times, so as to obtain the N−1 new first-class object files.

3. The method for generating an executable file of a multi-instance service according to claim 1 wherein the method further comprises: performing compilation for a source file corresponding to a single-instance service, to obtain a second-class object file; and performing linking to the first-class object file and the N−1 new first-class object files, to generate the executable file comprises: performing linking to the first-class object file, the N−1 new first-class object files, and the second-class object file, to generate the executable file.

4. The method for generating an executable file of a multi-instance service according to claim 1, the method further comprises:

receiving the service information input by a user.

5. A method for generating an executable file of a multi-instance service, comprising:

corresponding a source file to user identity card management software of a multi-Subscriber Identity Module (SIM) terminal;

receiving service information of a primary user identity card of the multi-SIM terminal and service information of a secondary user identity card of the multi-SIM terminal;

analyzing the service information of the primary user identity card and the service information of the secondary user identity card, to obtain a multi-instance service;

performing compilation for the source file corresponding to the multi-instance service to obtain a first-class object file, wherein the multi-instance service comprises N instances, and N is a natural number greater than or equal to 2;

performing an object copy of the first-class object file N−1 times, to obtain N−1 new first-class object files; and performing linking to the first-class object file and the N−1 new first-class object files, to generate an executable file.

6. A method for generating an executable file of a multi-instance service, comprising:

corresponding a source file to a camera driver of a multi-camera terminal;

receiving camera driver information of the multi-camera terminal;

analyzing the driver information of the multi-camera terminal, to obtain a multi-instance service;

performing compilation for the source file corresponding to the multi-instance service to obtain a first-class object file, wherein the multi-instance service comprises N instances, and N is a natural number greater than or equal to 2;

performing an object copy of the first-class object file N−1 times, to obtain N−1 new first-class object files; and performing linking to the first-class object file and the N−1 new first-class object files, to generate an executable file.

7. An apparatus for generating an executable file of a multi-instance service comprising:

a processor; and a non-transitory computer readable storage medium storing programming for execution by the processor, the programming including instructions for:

corresponding a source file to communications software of a multi-Subscriber Identity Module (SIM) multi-standby terminal;

receiving supported service information of a primary user identity card of the multi-SIM multi-standby terminal and supported service information of a secondary user identity card of the multi-SIM multi-standby terminal;

analyzing the supported service information of the primary user identity card and the supported service information of the secondary user identity card, to obtain a multi-instance service;

performing compilation for the source file corresponding to the multi-instance service to obtain a first-class object file, wherein the multi-instance service comprises N instances, and N is a natural number greater than or equal to 2;

performing an object copy of the first-class object file N−1 times, to obtain N−1 new first-class object files; and performing linking to the first-class object file and the N−1 new first-class object files, to generate an executable file.

8. The apparatus of claim 7, further comprising instructions that, when executed by the processor, cause the apparatus to perform renaming processing for a global symbol in the first-class object file N−1 times, so as to obtain the N−1 new first-class object files; or to perform localization processing for the global symbol in the first-class object file N−1 times, so as to obtain the N−1 new first-class object files.

9. The apparatus of claim 7 further comprising instructions that, when executed by the processor, cause the apparatus:

to perform compilation for a source file corresponding to a single-instance service, to obtain a second-class object file; and to perform linking to the first-class object file, the N−1 new first-class object files, and the second-class object file, to generate the executable file.

10. The apparatus of claim 7, further comprising instructions that, when executed by the processor, cause the apparatus, to receive the service information input by a user.

11. An apparatus for generating an executable file of a multi-instance service comprising:
a processor; and
a non-transitory computer readable storage medium storing programming for execution by the processor, the programming including instructions for:
corresponding a source file to user identity card management software of a multi-Subscriber Identity Module (SIM) terminal;
receiving service information of a primary user identity card of the multi-SIM terminal and service information of a secondary user identity card of the multi-SIM terminal;
analyzing the service information of the primary user identity card and the service information of the secondary user identity card, to obtain a multi-instance service;
performing compilation for the source file corresponding to the multi-instance service to obtain a first-class object file, wherein the multi-instance service comprises N instances, and N is a natural number greater than or equal to 2;
performing an object copy of the first-class object file N−1 times, to obtain N−1 new first-class object files; and
performing linking to the first-class object file and the N−1 new first-class object files, to generate an executable file.

12. An apparatus for generating an executable file of a multi-instance service comprising:
a processor; and
a non-transitory computer readable storage medium storing programming for execution by the processor, the programming including instructions for:
corresponding a source file to a camera driver of a multi-camera terminal
receiving camera driver information of the multi-camera terminal;
analyzing the driver information of the multi-camera terminal, to obtain a multi-instance service;
performing compilation for the source file corresponding to the multi-instance service to obtain a first-class object file, wherein the multi-instance service comprises N instances, and N is a natural number greater than or equal to 2;
performing an object copy of the first-class object file N−1 times, to obtain N−1 new first-class object files; and
performing linking to the first-class object file and the N−1 new first-class object files, to generate an executable file.

* * * * *